United States Patent
Bilgery

(10) Patent No.: US 7,311,062 B2
(45) Date of Patent: Dec. 25, 2007

(54) MILKING PLANT AND METHOD FOR REDUCING SOUND EMISSIONS IN A MILKING PLANT

(75) Inventor: Erwin Bilgery, Romanshorn (CH)

(73) Assignee: Moser Stalleinrichtungen and Bitec Engineering (CH)

( * ) Notice: Subject to any disclaimer, the term of this patent is extended or adjusted under 35 U.S.C. 154(b) by 518 days.

(21) Appl. No.: 10/479,838

(22) PCT Filed: Jun. 5, 2002

(86) PCT No.: PCT/CH02/00292

§ 371 (c)(1),
(2), (4) Date: Feb. 2, 2004

(87) PCT Pub. No.: WO02/098211

PCT Pub. Date: Dec. 12, 2002

(65) Prior Publication Data

US 2006/0196430 A1 Sep. 7, 2006

(30) Foreign Application Priority Data

Jun. 7, 2001 (CH) .................................. 1036/01

(51) Int. Cl.
*A01J 3/00* (2006.01)
(52) U.S. Cl. ................................. 119/14.07
(58) Field of Classification Search ............ 119/14.07, 119/14.08, 14.14; 417/295, 298
See application file for complete search history.

(56) References Cited

U.S. PATENT DOCUMENTS 2,350,454 A 2/1944 Conde ........................... 31/62
4,432,700 A * 2/1984 Icking ..................... 119/14.07
4,616,215 A 10/1986 Maddalena ................. 340/626

(Continued)

FOREIGN PATENT DOCUMENTS

EP 0442383 A1 * 7/1991

(Continued)

OTHER PUBLICATIONS

Patent Abstracts of Japan vol. 2000, No. 02, Feb. 29, 2000 JP 11 327447 A (RICOH CO LTD), Nov. 26, 1999.

*Primary Examiner*—Thomas Price
(74) *Attorney, Agent, or Firm*—Adams & Wilks

(57) ABSTRACT

The invention relates to a milking plant wherein the vibrations and sound emissions thereof are significantly reduced. In said inventive milking plant, a vacuum control valve (500) is directly connected to a vacuum compensation tank (200). The vacuum control valve (500) leads into the vacuum compensation tank (200) via a diffusor (501). The vacuum control valve (500) is enclosed in a cylindrical container (503). Preferably, the vacuum pump (110) and the vacuum compensation tank (200) are connected to each other via a main line (150) which is embodied in the form of two bent, flexible hoses. Preferably, the main line (150) leads tangentially into the vacuum compensation tank (200). The invention also relates to a method for reducing sound emissions in one such milking plant. According to said method, the flow speed of the air in the air-guiding parts (150, 200, 300, 302, 403, 420) of the milking plant is reduced. A buffer tank (300) can be used in the air line (30), enabling a stable operating vacuum to be obtained in addition to a reduction in structure-borne noise.

20 Claims, 3 Drawing Sheets

U.S. PATENT DOCUMENTS

| | | | |
|---|---|---|---|
| 5,289,848 A | | 3/1994 | Jenisch, Jr. ................. 137/545 |
| 5,992,347 A | * | 11/1999 | Innings et al. ........... 119/14.07 |
| 6,027,315 A | * | 2/2000 | Hogan ........................ 417/295 |
| 6,164,242 A | * | 12/2000 | Olofsson ................. 119/14.08 |
| 6,257,847 B1 | * | 7/2001 | Silver et al. ................ 417/415 |
| 7,048,000 B2 | * | 5/2006 | Koelzer ...................... 417/295 |

FOREIGN PATENT DOCUMENTS

| | | |
|---|---|---|
| EP | 0442383 | 8/1991 |
| EP | 1068796 | 1/2001 |
| GB | 700274 | 11/1953 |
| GB | 2128065 | 4/1984 |

\* cited by examiner

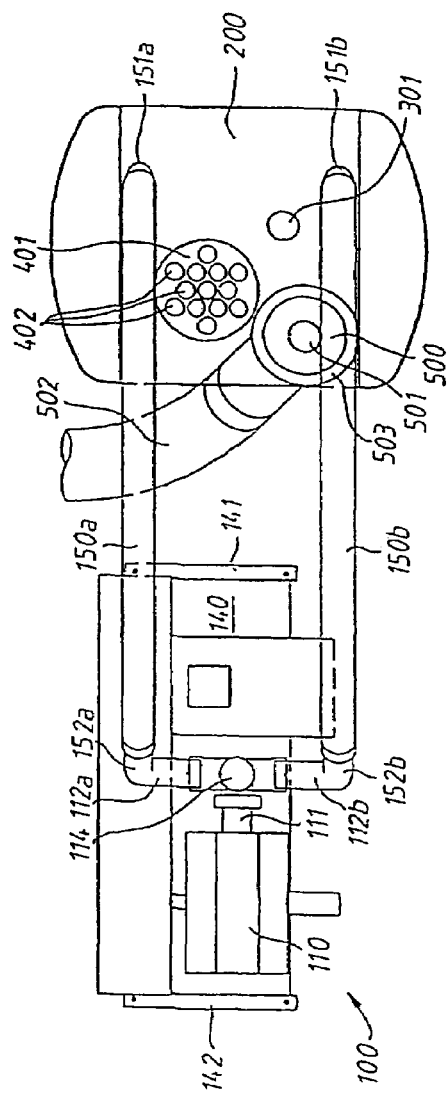
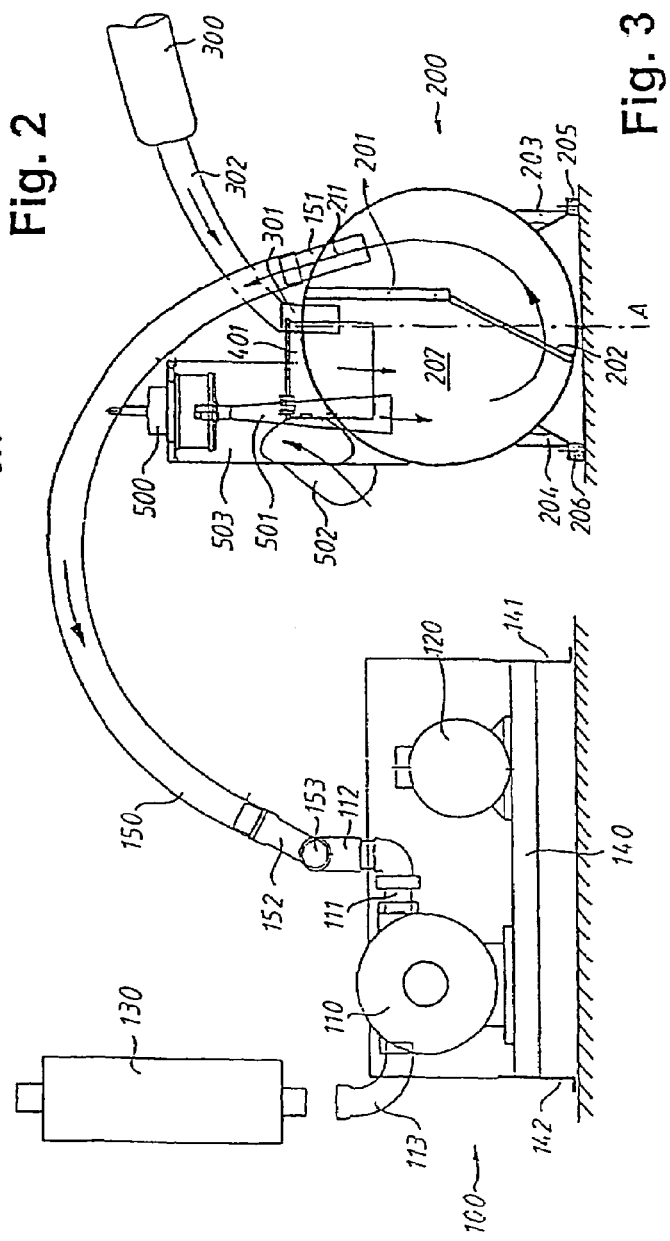
Fig. 2
Fig. 3

MILKING PLANT AND METHOD FOR REDUCING SOUND EMISSIONS IN A MILKING PLANT

CROSS REFERENCE TO RELATED APPLICATION

This application is a U.S. national stage of International Application No. PCT/CH02/00292, filed Jun. 5, 2002 and claiming a priority date of Jun. 7, 2001, and published in a non-English language, and priority thereto for common subject matter is hereby claimed.

BACKGROUND OF THE INVENTION

The present invention relates to a milking installation and to a method for the reduction of noise emissions in a milking installation.

Previously disclosed milking installations consist of numerous component parts, the interaction of which facilitates the milking of cows, sheep or goats. A vacuum is created by means of a vacuum pump unit, which comprises a vacuum pump and its drive motor. This vacuum is applied in an air line, to which the actual milking device is connected. A vacuum equalization tank is generally provided in order to maintain a stable vacuum. The vacuum equalization tank makes a certain volume of air available, whereby initial equalization of fluctuations in the vacuum can take place. Further equalization takes place by means of a vacuum control valve. By opening and closing the vacuum control valve, the admission of outdoor air into the system is controlled in such a way that the vacuum is maintained at a stable level.

At least one pulsator is also provided in a milking installation. As a rule, the pulsator consists of one or two independent, pneumatically or electrically directly (armature) or indirectly (membrane) activated valves, with the help of which in the milking device itself continuous alternation takes place between low pressure and normal pressure, which affects the actual milking procedure. The milking device consists of four teat cups and one collector piece. This is placed on the teats of the animal to be milked. The milking device has two connecting hoses. There is thus a pulsation hose, which is connected to the air line via the pulsator, and via which the milking procedure consisting of a suction phase and a pressure release phase is effected.

The milking device also exhibits a milk hose, by means of which the milk is led away. This discharges either into the milk pail or into a milk transport pipe, the so-called milk pipe. The milk is conveyed via this milk pipe to an end unit, the so-called milk collection vessel. The milk flows into this vessel and, on reaching a specific level, is led away by means of a milk pump to the actual milk storage tank, in which the milk is cooled and stored until collection. Finally, a safety separator is also provided. This is connected to the milk collection vessel. In the event of failure of the milk installation control system, the milk collection vessel may become overfull. The milk then flows into the safety separator. A float valve is raised here in sequence to close the outlet and the connection to the vacuum equalization tank. Operation of the milking installation is interrupted in this case. The milk in the safety separator must be drained manually and disposed of.

Milking installations of this kind are a source of constant noise when they are in operation. This noise derives from various elements of a milking installation. The elements responsible for generating the principal noise and vibrations can be mentioned.

Let us first make reference here to the vacuum pump unit. On the one hand this generates noise, for example in the form of engine noise, which is propagated through the air and which lies in the audible range. However, the noise is also propagated in the air pipe. Finally, because the air pipe is attached to the milking framework via flexible connections, the entire milking framework is caused to oscillate. The oscillations can also be transmitted in this way to living beings that are associated with the milking framework. The noise generated by the vacuum pump unit can also be propagated via the fabric of the building in the form of so-called structure-borne noise. This can ultimately lead to the oscillations being distributed through the entire structure of the building. A further unpleasant side-effect can also arise as a result of noise reflections occurring in the vacuum tank and in the air pipes, which contribute to multiplication of the noise frequency. It can also result in interference phenomena, whereby the amplitudes of the disturbances are amplified. This could lead to a frequency range being reached, which corresponds to the natural frequency of the milking parlour framework and is sufficiently powerful to excite this, too.

The pulsators must be regarded as a further source of disturbance. Pulsators today are electrically operated as a rule. The directly operated pulsators exhibit an armature valve, the impact of which in the end position provokes a heavy, jerking impulse. This impulse is conducted in the form of structure-borne noise directly into the air pipe and the milking parlour framework. The impact noise is clearly perceivable acoustically. Pulsators with indirect valve control are quieter in operation, on the other hand, because a membrane exhibits little mass. A particular disadvantage in this respect is the fact that the opening and closing movement takes place very rapidly and, in so doing, forces a powerful air blast into the air pipe, which is similarly capable of producing a disadvantageous effect. This noise emission manifests itself on the one hand via the vacuum, and on the other hand as structure-borne noise. Multiplication of the impact intensity can occur as a consequence of the parallel connection of all the pulsators. A further negative effect is that air enters the air pipe at regular intervals as a consequence of the pulsation. The vacuum is disturbed in this way, and this can trigger an opposing reaction in the sensitive vacuum control valve.

The vacuum control valve can be mentioned as the third source of noise. The vacuum control valve varies the admission of air so that the vacuum can be maintained at a constant level. The velocity of the arriving air is dependent on a variety of factors. It is thus dependent on the quality of manufacture of the valve, but also on the location of the milking installation above sea level, and thus on the atmospheric pressure. At an altitude of 1500 m, the velocity of the arriving air can even reach the speed of sound. As soon as the speed of sound is reached, however, stall conditions occur briefly. This condition is associated with a whistling noise. The entry of air into the vacuum system after opening the control valve is perceived in any case, however, since the air enters the vacuum system relatively rapidly, so that turbulence phenomena and oscillations occur. In addition, the milk pump is also one of the principal sources of noise.

The generated noises, vibrations and oscillations are distributed through the entire milking installation. They are ultimately also perceived by the animals, both on the basis of their transmission through the air, and on the basis of structure-borne noise, for example via the milking parlour frameworks against which the animals lean during the milking procedure. High-output animals are extremely sensitive, however, and react even to the slightest disturbances by giving a reduced milk yield. The general well-being of the animals is also susceptible to disruption in this way and, in extreme cases, an arrested milk flow can lead to udder inflammation.

The current state of the art has until now offered only two approaches to the reduction of these noise and vibration effects. It is known that the application of a rubber covering to all pipes, and in particular the pipes constituting the air pipe, reduces the propagation of noise in the pipe. Another approach is revealed in the playing of music, in particular classical music, in the milking area, which is claimed to produce an increase in the flow of milk from the animals and to improve their psychological state. However, the previously disclosed approaches to finding a solution are ultimately unsatisfactory and insufficient.

Further problems are associated with the vacuum control valve in conventional milking installations. Thus, a consequence of the pressure wave generated by the pulsator is that the sensitive vacuum control valve begins to oscillate, in spite of the fact that the vacuum remains stable from an overall point of view. As a result of this, too much air is supplied to the system as a whole, which must be removed by the vacuum pump. The vacuum can fall significantly as a result of this, in fact within a period of ca 1 second. However, the constant operation of the vacuum pump causes the vacuum to rise again relatively quickly. Vacuum instability prevails within the system, in spite of this, and this should be avoided in order to ensure a good milking procedure.

SUMMARY OF THE INVENTION

The purpose of the present invention is thus to make available an improved milking installation compared with the state of the art. In particular, a milking installation should be made available with steeply reduced emissions of vibrations and noise. Moreover, the milking installation that is made available should exhibit improved tolerance to small fluctuations in the vacuum. Furthermore, a method for the reduction of noise emissions in milking installations should be made available.

A milking installation in accordance with the invention consists of the following components, which are already described in greater detail in relation to the state of the art: a vacuum pump unit, a vacuum equalization tank, a main pipe between the vacuum pump and the vacuum equalization tank, a vacuum control valve, an air pipe, at least one pulsator, at least one milking device that is connected via a pulse hose to the air pipe and via a milk hose to a milk pipe, a milk pipe, a milk collection vessel and a safety separator. Contrary to the state of the art, however, the vacuum control valve in a milking installation in accordance with the invention is attached directly to the vacuum equalization tank. Because a state-of-the-art vacuum control valve frequently generates noises, even as high as whistling tones, as outside air is admitted, and because the vacuum control valve also reacts extremely sensitively to fluctuations in the vacuum, as described above, the attachment of the vacuum control valve to the vacuum equalization tank enables the vacuum as a whole to be kept more stable, as any change in the vacuum must occur inside the relatively large volume of the vacuum equalization tank before the vacuum control valve opens. As already outlined, however, the fact that the opening of the vacuum control valve and the subsequent admission of air constitute a significant source of noise in the system is associated with a considerable advantage in the form of a steep reduction in noise emission.

There is also a particular preference for a diffuser to be provided on the vacuum control valve, by means of which the velocity of the air entering the vacuum equalization tank is reduced to such a great extent that this noise can be lowered by four to five decibels. The diffuser preferably exhibits a smooth surface on the inside in order to ensure an unimpaired air flow. Polyester reinforced with woven glass fibre is the preferred material. It is also preferable for the air supply to the vacuum control valve to be provided externally, or, to put it another way, for clean air from the outside area to be supplied when the vacuum control valve is opened, for example via a hose pipe.

A further preferred illustrative embodiment of the invention provides for the main pipe between the vacuum pump and the vacuum equalization tank not to assume the form of a rigid pipe, but at least the form of a flexible, curved hose. An effective reduction in the propagation of structure-borne noise is already achieved through the use of a hose in place of the pipe. Provision is also made for a number of hoses, in particular two hoses, to be routed in parallel, so that the flow velocity of the air lies below a specific limit for a relatively small diameter of the hose. Provision is also made for this hose to discharge tangentially into the vacuum equalization tank; to put it another way, this hose discharges tangentially to the principal direction of flow of the air. A circular air flow through the tank is encouraged in this way. The fact that turbulence phenomena are kept low by the provided entry and exit of the air also leads to a reduction in noise emissions. A dividing wall is also provided in the vacuum equalization tank. On the one hand this obliges the circular air flow, and on the other hand the strong intake noise of the vacuum pump is sealed off from the milking side. An air filter is incorporated in this dividing wall. This distributes the air flow over the whole area, and the flow is caused to slow down accordingly and is thus quieter.

A further illustrative embodiment provides for the air that is fed from the safety separator to the vacuum equalization tank not to be discharged directly into the vacuum equalization tank, but for a division of the air to be undertaken. This is effected by the connection in series of a number of parallel, hose-formed dividing elements. These parallel hose-formed dividing elements discharge into the vacuum equalization tank via a dome. Division of the structure-borne noise within the vacuum system is achieved in this way. The oscillations at higher frequencies, which are caused by the vacuum control valve, are also attenuated.

A further preferred illustrative embodiment relates to the one pulsator at least. This is flexibly attached, for example suspended by means of rubber hoses, from the fabric of the building (ceiling), from the milking parlour framework or from the air pipe. The propagation of the noise generated by the pulsator, and in particular the impact noise generated by the armature valve, to the air pipe and its spread to the milking parlour framework is prevented, i.e. it is separated by technical measures.

A further illustrative embodiment provides for the air pipe to be replaced by a buffer tank, which is arranged in the immediate vicinity of the pulsator. This buffer tank is connected to the vacuum equalization tank by means of an elastic pipe with a small diameter, in particular a rubber hose. This also permits transmission on the basis of structure-borne noise or propagation of the noise in the vacuum to be prevented. Provision is also made for the volume in the buffer tank to be about 30 litres per connected pulsator. The diameter of the buffer tank should be dimensioned according to its distance from the connected pulsators, in such a way that the available volume can be allocated immediately to the pulsator. In this way, the pressure wave does not reach the vacuum equalization tank and is thus unable to cause regulation of the vacuum control valve.

A particular component is the reduction of the velocity of the air flowing in the air-carrying elements. This reaches far in excess of 20 m/s in previously disclosed milking installations; in an installation in accordance with the invention, it is reduced to less than 8 m/s. The noise and vibration emissions are greatly reduced by means of the described measures (individually or in combination). It is possible in this way to take particular steps to prevent the transmission of the vibrations to the animals by structure-borne noise. The well-being not only of the animal, but also of the milker, is increased in this way. Animal health is also improved. Ultimately, an improvement in the quality of the milk and a higher milk yield are achieved in this way. Poor output and failure to produce by the animal can also be reduced.

The method in accordance with the invention for the reduction of noise emissions in a milking installation provides for reduction of the flow velocity of the air in the air-carrying parts of the milking installation. The emission of noise is reduced significantly in this way. This can be attributed to two physical causes. On the one hand a slower air flow and the associated slower passage of the air through the elements of the milking installation lead to the avoidance of noises largely or even entirely, for example whistling noises, which are caused, for example, by the air flowing past an edge at high speed. The reduction in the velocity of the air for a constant frequency of the noise also leads to the amplitude of the noise being kept lower. A reduction in the sound power has two consequences. On the one hand the disturbing and frequently encountered frequency band around 200 Hz is no longer perceived as such by humans and animals, and on the other hand the sound level in the area of the milking parlour is then too low to cause the milking parlour framework to resonate. Slight vibrations of a purely tactile nature can still be felt in the installation, however.

A preferred illustrative example of the method in accordance with the invention provides for the air from the vacuum equalization tank to enter and exit tangentially to the principal direction of flow. The air is obliged to adopt a certain direction of flow in this way, which leads to the far-reaching avoidance of turbulence phenomena and the associated high air velocities, which can lead to strong reflections at various points in the tank. It also provides for the air from the vacuum pump to be supplied from the vacuum equalization tank via a main pipe in the form of two flexible curved hoses. The use of curved hoses leads to the mechanical movement (vibration) of the pump device not being able to propagate itself in a linear fashion to the connected vacuum equalization tank. By using a hose with a small internal diameter, the air flow on the internal wall is slowed down, and a significant proportion of the disturbing sound waves from the vacuum pump are absorbed. The resistance to which the flowing air is subjected results in a corresponding drop in pressure in the connecting pipe. The flow velocity also increases in line with the increasing difference in pressure between the inlet and outlet of a pipe. In order to keep the flow velocity low, an increase in the transport capacity by the use of at least a second hose connection is necessary.

The method in accordance with the invention preferably also provides for the supply of air to the vacuum equalization tank via the control valve to take place via a diffuser. The physical principle that applies here is that the flow velocity of the air is reduced by enlarging the diameter of the passageway through which the air passes.

BRIEF DESCRIPTION OF THE DRAWINGS

FIG. 2 is a top view of a section of a milking installation in accordance with the invention;

FIG. 3 is a side view of the milking installation shown in FIG. 2;

DETAILED DESCRIPTION OF THE INVENTION

Figure 1:
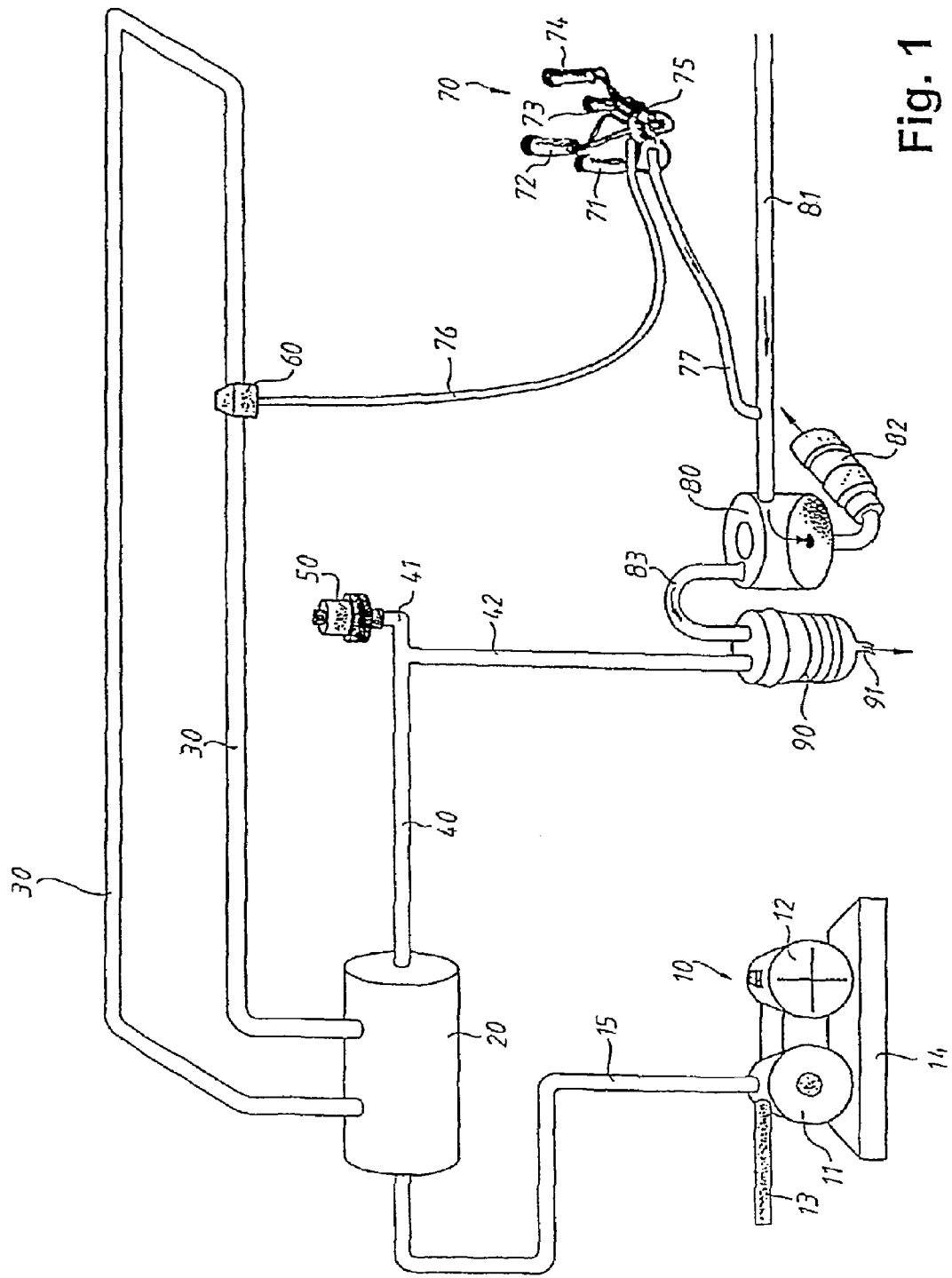
FIG. 1 is a schematic view of a milking installation previously disclosed in the prior art.

As can be appreciated from FIG. 1, a milking installation previously disclosed in the prior art consists of a number of component parts. The milking installation in accordance with the invention also exhibits these previously disclosed component parts. There is accordingly no need for them to be explained and described in greater detail here. A milking installation thus exhibits a vacuum pump unit 10, which consists of the actual vacuum pump 11, its drive motor 12 and an outlet 13. The vacuum pump unit 10 stands on a base 14. A vacuum is created in the air-carrying system of the milking installation by the constant pumping out of air by the vacuum pump 11. A main pipe 15 connects the vacuum pump 11 to a vacuum equalization tank 20. An air pipe 30, which is executed as a ring circuit in the execution example in FIG. 1, exits from the vacuum equalization tank 20. The air pipe 30 may also have a "blind" end, however, and a circuit is not essential. An air-carrying pipe 40 also discharges into the vacuum equalization tank 20. On the one hand air from the vacuum control valve 50 is supplied via the air-carrying pipe 40 to the vacuum equalization tank 20 via the feed pipe 41, and on the other hand the safety separator 90 is ventilated or evacuated by means of the pipe 40 via the pipe 42. The relatively large air volume of the vacuum equalization tank 20 serves to keep the vacuum stable, since small changes in the application of the vacuum can be equalized by this large volume. Fine regulation of the vacuum takes place by means of the vacuum control valve 50, which opens or closes as required and, in so doing, either supplies air from the outside or interrupts this air supply.

The pulsator 60 is an important part of the milking installation. It applies a vacuum to the milking device 70 cyclically. The milking device 70 consists of four teat cups 71 and the collector piece 75. It is attached to the pulsator 60 by means of a pulse hose 76, and to the milk pipe 81 by means of the milk hose 77. The pulsator 60 is, either securely attached to the air pipe 30 or is mounted on a transportable element capable of being clipped to the air pipe 30. The milk after milking is led to an end unit, namely a milk collection vessel 80, via the milk hose 77 and the milk pipe 81. Milk flowing in from the milking device 70 is collected here and is pumped in portions by means of the milk pump 82 into the end collection vessel, the so-called milk tank. In the event of the milk collection vessel 80 overflowing due to a technical fault, a safety separator 90 is provided, into which the excess milk is taken via a pipe 83 in order to prevent milk finding its way into the air-carrying system. The quantity of milk held in the safety separator 90 must not be released for human consumption. The direction of flow of the milk in the milk-carrying elements of the milking installation is indicated by the arrows. The basic numbering of the individual component parts of the milking installation has been retained logically in the other Figures and is extended by one digit.

FIGS. 2 and 3 show a top view and a side view of a vacuum pump unit 100 in accordance with the invention with a main pipe 150, vacuum control valve 500 and vacuum equalization tank 200. In the interests of better understanding, the direction of flow of the air in FIG. 3 is indicated by arrows. The vacuum pump unit 100 is now mounted on elastic, in particular rubber feet 141, 142, whereby the transmission of noise to the floor is reduced. The vacuum pump unit 100 consists of the actual vacuum pump 110 and its drive motor 120, which are arranged on a chassis frame 140. The vacuum pump 110 exhibits on the one hand an exhaust air pipe 113, which discharges into the outlet 130 (not shown here). The vacuum pump 110 also exhibits a supply pipe 111, which discharges into the main pipe 150 via the pipe 112. The main pipe 150 is connected to the supply pipe 112 via an adapter 152. Provision is also made for this connection to be articulated, in particular via an adjustable pipe thread 153, whereby the position of the main pipe 150 can be varied depending on the spatial situation. Provision is thus made in accordance with the invention for the main pipe 150 to consist of a flexible hose material, which produces a particularly positive effect-on the prevention of the propagation of airborne and structure-borne noise.

Provision is also made, as can be appreciated from FIG. 2, for two main pipes 150*a* and 150*b* to be provided, instead of a single main pipe 150 (see FIG. 1, reference designation 15). It is also possible to provide more than two main pipes 150*a* and 150*b*, for example from three to ten in number. These satisfy the characteristics in accordance with the invention equally. The air flowing in the direction of the vacuum pump 110 is combined together again by means of the adapter 114. By analogy with the two main pipes 150*a*, 150*b*, two supply pipes 112*a*, 112*b* and 152*a*, 152*b* are also provided. A further reduction in noise is also achieved by this division of the air flow into two main pipes 150*a*, 150*b*. The two main pipes 150*a*, 150*b* discharge via two matching end pieces 151*a*, 151*b* in the vacuum equalization tank 200.

The invention also provides for the main pipe 150 to discharge tangentially into the vacuum equalization tank 200 to promote a circular flow of air within the vacuum equalization tank. In this way, the air flow arriving from the vacuum equalization tank 200 is not diverted from its principal direction of flow as it enters the main pipe 150. This tangential air supply can take place at low angles relative to the principal axis A of the vacuum equalization tank 200. Provision is also preferably made for the tangential air supply to take place at an angle of 5 to 30°, and in particular 16°, formed by the principal axis A of the vacuum equalization tank 200 and the center line 211 of the air supply. The air flowing into the vacuum equalization tank 200 (e.g. arriving from the air pipe or from a buffer tank 300) flows uniformly through the interior 207 of the vacuum equalization tank 200 in a generally circular direction, as indicated by an arrow. A dividing wall 201 provided in the vacuum equalization tank 200 imposes circular and more favorable guiding of the air. Additional provision is preferably also made for the air flow to be guided through a close-meshed filter 202. The air flow as it passes is thus distributed more or less over the entire surface of the filter. On the one hand higher frequencies are absorbed in this way, and on the other hand potentially harmful foreign bodies for the vacuum pump are excluded.

Further noise attenuation is achieved by standing the feet 203, 204 of the vacuum equalization tank 200 on resilient members, such as rubber feet or similar damping materials 205, 206 on the floor. Additional provision is preferably also made for the vacuum control valve 500 to be attached directly to the vacuum equalization tank 200. Provision is also made for the vacuum control valve 500 to discharge via a diffuser 501 into the vacuum equalization tank 200. In this way the air flowing in via the vacuum control valve 500, as indicated by corresponding arrows, is fed into the vacuum equalization tank 200 through the progressively widening passage of the diffuser 501. The flow velocity of the supplied air is thus reduced, which in turn leads to a reduction in the resulting noises.

Provision is also made for the vacuum control valve 500 to be surrounded by a cylindrical container 503. The container 503 insulates the vacuum control valve 500 acoustically from its surroundings on the one hand, and on the other hand it produces a specific air flow to the vacuum control valve 500. Provision is made in addition for ambient air to be supplied to the vacuum control valve via a hose 502, in conjunction with which the hose 502 has its intake orifice preferably in the external area of the milking installation, so that a constant supply of fresh air, preferably free from dust, is always provided. If the vacuum pump unit 100 is protected by a noise insulation cover, an additional cooling arrangement will be required. Alternatively, the possibility is available to extract the heated air from this cover via the hose 502. The path of the air through the vacuum control valve 500 is indicated by corresponding arrows.

As an additional access, the vacuum equalization tank 200 is provided with a chamber or so-called dome 401, into which the pipe 40 and 42 arriving from the safety separator 90 discharges. This discharge does not take place directly, however, but via an adaptor consisting of parallel-routed, non-fibrous rubber hoses, as explained and described below with reference to FIG. 4. The individual supply openings 402 to the dome 401 are indicated in FIG. 2. In the illustrative embodiment in FIG. 2, 13 supplies 403 and 13 associated supply orifices 402 are provided. Their number may vary depending on the delivery output of the vacuum pump. The surface area is significantly enlarged by this subdivision into several non-fibrous elastic hoses in relation to a single hose with the same air flow velocity. The air encounters significantly stronger frictional resistance in this way. In conjunction with the specific length of this divided section, an effective barrier is obtained for the prevailing noises (frequencies) in the vacuum equalization tank.

A diversion 301 to the buffer tank 300 is also provided (see FIG. 3). This is used to supply air to the vacuum equalization tank 200, and this air is then supplied via the main pipe 150*a* and 150*b* to the vacuum pump 110. Provision is preferably made for the buffer tank 300 to be acoustically separated from the vacuum equalization tank 200. This is achieved by the connection in series of a flexible pipe 302, preferably a rubber hose with a small cross section. Any occurring acoustic events, which are introduced into the buffer tank 300 by the pulsator 60, are attenuated in this way. The buffer tank 300 is arranged in the immediate vicinity of the pulsator 60. The volume of the buffer tank 300 is dimensioned in such a way that the pulsating air arriving as a pulse cycle from the pulsator 60 is capable of producing only a tolerable fall in the vacuum in the buffer tank 300. The buffer tank 300 is attached elastically to the fabric of the building (ceiling) or to the milking parlour framework. The diameter of the air pipe 302 must be dimensioned in accordance with a specific conductivity, so that the level of the vacuum at the end of a given pulse cycle reverts precisely to the value prevailing inside the vacuum equalization tank 200. In order to achieve the necessary conductivity, it is preferably possible to connect sections of different length and diameter to one another in the air pipe 302.

Figure 4:
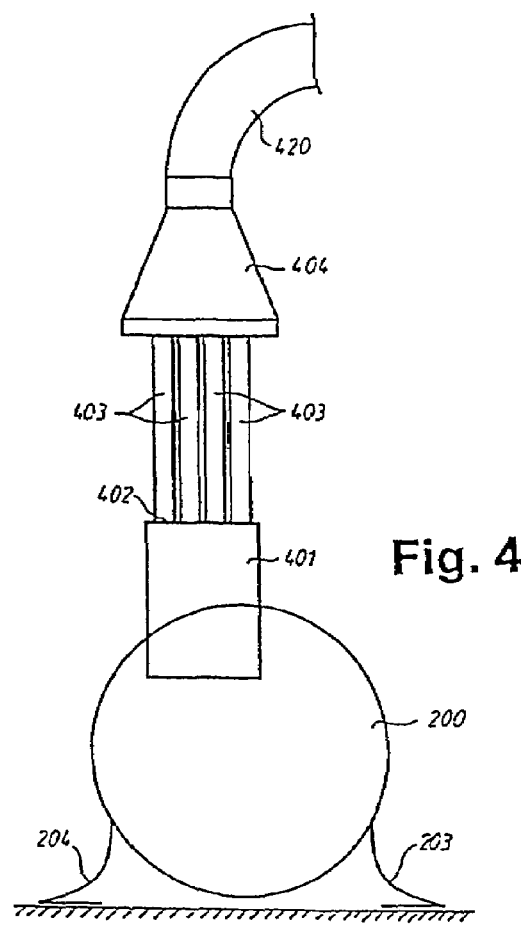
FIG. 4 is a side view of a further detail of a milking installation in accordance with the invention.

FIG. 4 shows the air guide in the area of the dome or chamber 401. The vacuum equalization tank 200 with its feet 203, 204 is only represented schematically. The other inlets and outlets (151, 501 and 301) and the vacuum control valve 500 are not illustrated. The pipe 420 arriving from the safety separator 90 now discharges in accordance with the invention not directly via the dome 401 into the vacuum equalization tank 200, but is separated from it. For this purpose the air is split in an adapter 404 into a variable quantity of hose-formed dividing elements 403. The hose-formed dividing elements 403 discharge via the opening 402 into the dome 401 and thus into the vacuum equalization tank 200. The number of hose-formed dividing elements 403 can be selected as required, and in particular in accordance with the pumping capacity of the vacuum pump 110. The number of hose-formed dividing elements 403 provided should preferably be between four and twenty. An acoustic division is provided by the design of this transition in accordance with the invention, or, to put it another way, the separation between the vacuum pump and the milking system; any noise that is present is not passed on, but is absorbed in the hose-formed dividing elements 403.

Figure 5:
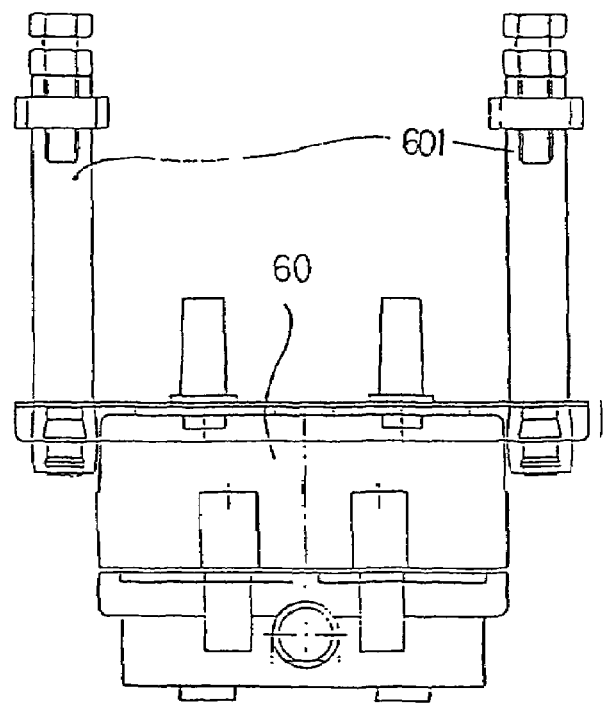
FIG. 5 illustrates a preferred suspension arrangement for a pulsator.

A further embodiment of the pulsator 60 in accordance with the invention is represented in FIG. 5. This is flexibly attached, in particular suspended by means of rubber hoses 601. In this way, the pulsator 60 is no longer rigidly attached to the air pipe 300, but is suspended by means of flexible elements, in particular rubber hoses, whereby the impact noises generated by the pulsator 60 are damped.

The invention claimed is:

1. A milking installation comprising: a vacuum pump having a suction side and an exhaust side; a vacuum equalization tank connected to the suction side of the vacuum pump by a first pipe; at least one pulsator connected to the vacuum equalization tank by a second pipe; at least one milking device attachable to an animal to be milked during use of the milking installation and connected to the at least one pulsator by a pulse hose; and a vacuum control valve that is attached to the vacuum equalization tank and that admits ambient air through a diffuser into the interior of the vacuum equalization tank to control the level of vacuum in the vacuum equalization tank, the diffuser projecting into the interior of the vacuum equalization tank and reducing the flow velocity of the admitted ambient air to thereby reduce noise associated with the ambient air flow.

2. A milking installation according to claim 1; wherein the vacuum control valve is enclosed by a cylindrical container.

3. A milking installation according to claim 1; further including an air hose having one end open to ambient air and the other end connected to supply ambient air to the vacuum control valve.

4. A milking installation according to claim 1; wherein the first pipe comprises two flexible hoses each connected at one end to the suction side of the vacuum pump and connected at the other end to the vacuum equalization tank.

5. A milking installation according to claim 4; wherein the other ends of the two flexible hoses terminate in end pieces that project into the vacuum equalization tank at an angle effective to promote circular air flow within the vacuum equalization tank.

6. A milking installation according to claim 1; wherein the vacuum equalization tank contains therein a dividing wall that partially divides the interior of the vacuum equalization tank and helps promote circular air flow within the vacuum equalization tank.

7. A milking installation according to claim 6; wherein the vacuum equalization tank contains therein a filter disposed in the path of the circular air flow.

8. A milking installation according to claim 1; further including a safety separator connected to one end of a third pipe, the other end of the third pipe being connected to one of the ends of plural hoses, and the other ends of the plural hoses being connected to and opening into a chamber that opens into the vacuum equalization tank.

9. A milking installation according to claim 8; wherein the plural hoses comprise five to twenty hoses.

10. A milking installation according to claim 1; wherein the at least one pulsator is flexibly suspended from a support.

11. A milking installation according to claim 1; further including a buffer tank connected between the at least one pulsator and the vacuum equalization tank by a flexible pipe.

12. A milking installation according to claim 1; wherein the vacuum equalization tank is supported on resilient members.

13. A milking installation according to claim 1; wherein the vacuum equalization tank has a generally cylindrical shape having a length approximately equal to its diameter.

14. A milking installation according to claim 1; wherein the first pipe has one end connected to the suction side of the vacuum pump and the other end terminating in an end piece that projects into the vacuum equalization tank at an angle effective to promote circular air flow within the vacuum equalization tank.

15. A milking installation according to claim 14; wherein the vacuum equalization tank has a generally cylindrical shape, and the end piece projects into the vacuum equalization tank at an angle effective to promote circular air flow around the interior of the cylindrical-shaped vacuum equalization tank.

16. A milking installation according to claim 1; wherein the diffuser has a progressively widening passage in the direction in which the diffuser projects into the vacuum equalization tank.

17. A milking installation according to claim 1; wherein the first pipe is comprised of flexible hose material.

18. A milking installation according to claim 1; further including a safety separator connected to the vacuum equalization tank through a plurality of flow-dividing elements, the flow-dividing elements dividing the flow of air from the safety separator into a plurality of parallel-routed air flows that discharge into the vacuum equalization tank.

19. A milking installation according to claim 18; wherein the flow-dividing elements comprise elastic hoses.

20. A milking installation according to claim 18; further including a chamber connected to and projecting into the vacuum equalization tank, the flow-dividing elements being connected to discharge the parallel-routed air flows into the chamber from which the air flows into the vacuum equalization tank.

* * * * *